US012164955B2

(12) United States Patent
McCallum et al.

(10) Patent No.: US 12,164,955 B2
(45) Date of Patent: Dec. 10, 2024

(54) COMPUTING TASK SCHEDULING IN A COMPUTER SYSTEM UTILIZING EFFICIENT ATTRIBUTED PRIORITY QUEUES

(71) Applicant: Red Hat, Inc., Raleigh, NC (US)

(72) Inventors: Nathaniel McCallum, Raleigh, NC (US); Monis Khan, Raleigh, NC (US); Benjamin Petersen, Raleigh, NC (US); Jonathan Toppins, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 817 days.

(21) Appl. No.: 17/195,187

(22) Filed: Mar. 8, 2021

(65) Prior Publication Data
US 2021/0191768 A1 Jun. 24, 2021

Related U.S. Application Data

(63) Continuation of application No. 16/116,303, filed on Aug. 29, 2018, now Pat. No. 10,942,768.

(51) Int. Cl.
G06F 9/48 (2006.01)
G06F 9/30 (2018.01)
G06F 9/54 (2006.01)

(52) U.S. Cl.
CPC ........ *G06F 9/4881* (2013.01); *G06F 9/30018* (2013.01); *G06F 9/546* (2013.01); G06F 2209/486 (2013.01)

(58) Field of Classification Search
CPC .... G06F 9/4881; G06F 9/30018; G06F 9/546; G06F 2209/486; G06F 9/5044; G06F 2209/5021
See application file for complete search history.

(56) References Cited

U.S. PATENT DOCUMENTS

| | | | |
|---|---|---|---|
| 7,827,435 B2 | 11/2010 | Sahoo et al. | |
| 8,205,208 B2 | 6/2012 | Mausolf et al. | |
| 8,875,142 B2 | 10/2014 | Shivanna et al. | |
| 9,465,658 B1 | 10/2016 | Shashi | |
| 9,575,800 B2 | 2/2017 | Brown | |
| 2002/0062427 A1* | 5/2002 | Chauvel | G06F 1/329 711/138 |
| 2003/0236815 A1* | 12/2003 | Brenner | G06F 9/505 718/104 |
| 2008/0250069 A1 | 10/2008 | Hanks | |
| 2009/0300632 A1* | 12/2009 | Falcon | G06Q 10/00 718/103 |
| 2013/0013897 A1* | 1/2013 | Bellows | G06F 9/4843 712/214 |

(Continued)

Primary Examiner — Kenneth Tang
(74) Attorney, Agent, or Firm — Dority & Manning, P.A.

(57) ABSTRACT

Aspects of the disclosure provide for mechanisms for scheduling computing tasks in a computer system. A method of the disclosure includes determining one or more attributes associated with a computing task, determining an ordered list of the attributes in view of priorities associated with the attributes, generating a first numerical representation of the attributes in view of the ordered list of the attributes, determining a second numerical representation of a priority of the computing task, and determining a third numerical representation of a total priority of the computing task in view of the first numerical representation and the second numerical representation.

11 Claims, 10 Drawing Sheets

(56) References Cited

U.S. PATENT DOCUMENTS

| | | | |
|---|---|---|---|
| 2014/0040904 A1* | 2/2014 | Giusto | G06F 9/4881 |
| | | | 718/103 |
| 2015/0293793 A1* | 10/2015 | Vrind | G06F 9/4887 |
| | | | 718/103 |
| 2015/0331716 A1* | 11/2015 | Brown | G06F 9/4881 |
| | | | 718/103 |
| 2016/0179574 A1* | 6/2016 | Merrill, III | G06F 7/523 |
| | | | 718/106 |
| 2016/0321071 A1* | 11/2016 | Hansen | G06F 9/30101 |
| 2017/0279734 A1* | 9/2017 | Goncalves | H04L 47/781 |
| 2018/0011655 A1* | 1/2018 | Gredler | G06F 16/2282 |
| 2018/0321971 A1* | 11/2018 | Bahramshahry | G06F 9/4881 |
| 2019/0073254 A1* | 3/2019 | Vibhor | G06F 11/0784 |
| 2019/0114202 A1 | 4/2019 | Wang et al. | |
| 2019/0243547 A1* | 8/2019 | Duggal | G06F 3/0619 |
| 2020/0401440 A1* | 12/2020 | Sankaran | G06F 9/3851 |
| 2022/0214925 A1* | 7/2022 | Kipp | G06F 9/4881 |

* cited by examiner

COMPUTING TASK SCHEDULING IN A COMPUTER SYSTEM UTILIZING EFFICIENT ATTRIBUTED PRIORITY QUEUES

RELATED APPLICATIONS

This application is a continuation application of co-pending U.S. patent application Ser. No. 16/116,303, filed Aug. 29, 2018, which is herein incorporated by reference.

TECHNICAL FIELD

The implementations of the disclosure relate generally to computer systems and, more specifically, to scheduling computing tasks in a computer system utilizing priority queues.

BACKGROUND

A computer system can typically process multiple computing tasks (e.g., jobs), each of which may correspond to one or more processes. The computer system may use a scheduler to schedule executions of the computing tasks. For example, the scheduler may prioritize the computing tasks and assign resources to the computing tasks accordingly to complete the computing tasks. Scheduling the computing tasks may involve queuing the computing tasks.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
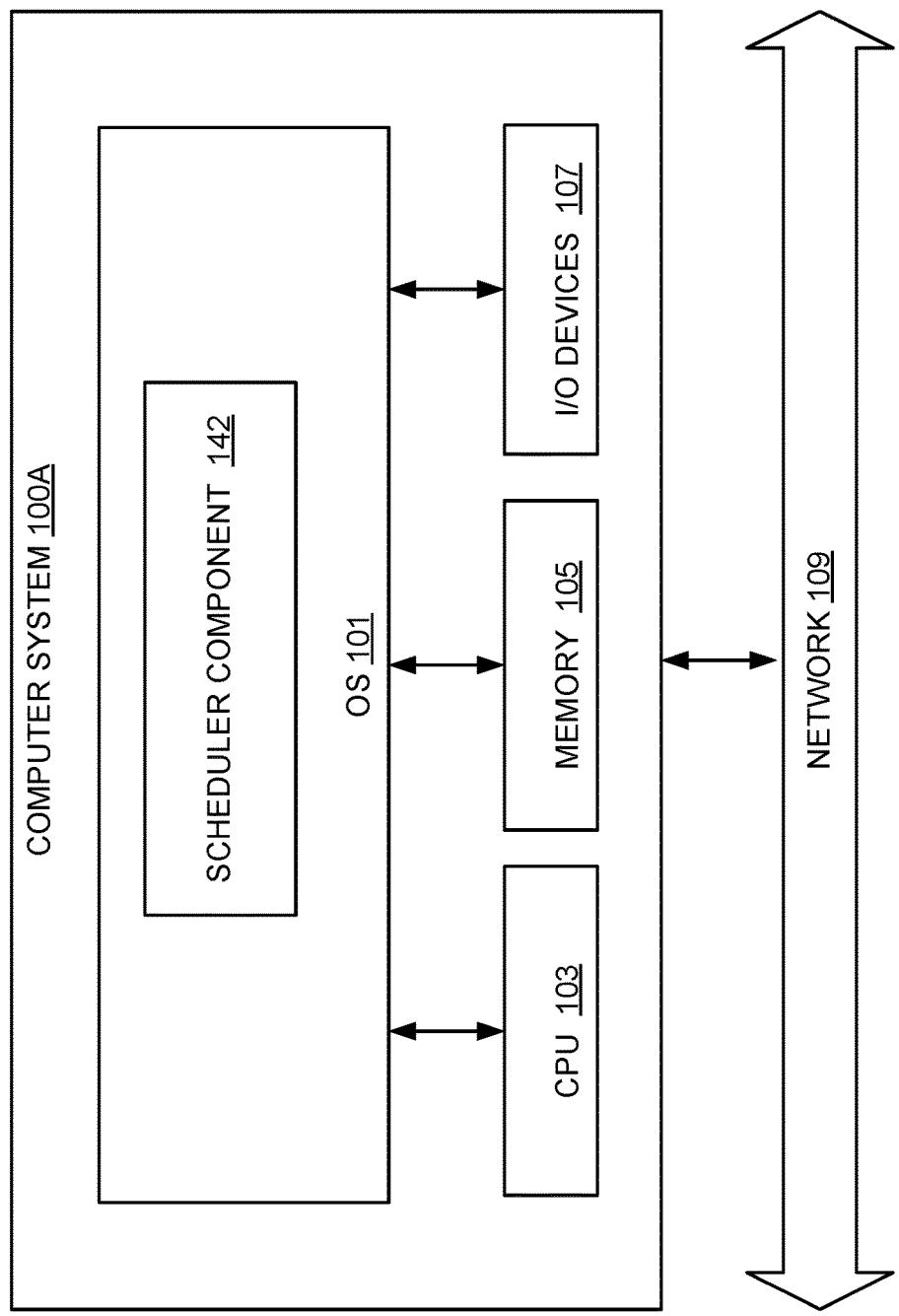
FIGS. 1A and 1B are block diagrams of computer systems in which implementations of the disclosure may operate.

Scheduling computing tasks across multiple processing entities (e.g., nodes) of a computer system may involve creating a priority queue of computing tasks to be processed. The computing tasks may be arranged in the priority queue in an order corresponding to their priorities. For example, the first computing task in the priority queue may have the highest priority. When a processing entity (e.g., a node) of the computer system is to execute a computing task (e.g., if the processing entity is idle), the processing entity may execute the first computing task in the priority queue. However, such implementation of the priority queue may not be suitable for a heterogeneous computing environment in which various processing entities possess different computing capacities and other attributes. For example, the computing tasks in the priority queue may be processed by processing entities of certain computing capacities and other attributes. A node in the heterogeneous computing environment may not be able to process the first computing task in the priority queue when it pulls the first computing task from the priority queue.

Prior solutions for computing task scheduling typically use separate priority queues for computing tasks requiring various attributes of processing units. As a result, n!+2 queues are used for scheduling computing tasks requiring n attributes of processing units. For example, the prior solutions for computing task scheduling may need 40,322 priority queues to schedule computing tasks requiring 8 attributes of processing units. As such, the prior solutions for computing task scheduling do not scale and may result in significant CPU overhead.

Aspects of the disclosure address the above and other deficiencies by providing mechanisms (e.g., systems, methods, machine-readable media, etc.) for computing task scheduling in a computer system utilizing efficient attributed priority queues. As referred to herein, a computing task may be any task that can be processed by one or more components of a computer system. Examples of the computing task may include executing a process, executing a software program, creating a container, deploying an application, hosting an application, deploying a virtual machine, migrating a virtual machine, etc. A processing unit of a computer system may be and/or include any component of a computer system, such as one or more processors, memory devices, network devices, virtual machines, host machines, nodes, containers, clouds, etc.

The mechanisms can schedule computing tasks to be processed by one or more computer systems in view of attributes and priorities of the computing tasks. Each of the attributes may be a feature of a processing unit required to process the computing task, such as a compute resource (e.g., a network resource, a processor resource, a memory resource, etc.) that can be provided by the processing unit, a hardware capacity of the processing unit (e.g., presence of a graphics processing unit, presence of a network accelerator, etc.), and/or any other feature of the processing unit related to execution of the computing task.

For example, the mechanisms can generate numerical representations of the computing tasks in view of the attributes and the priorities of the computing tasks. Each of the numerical representations may include one or more values corresponding to a priority of a given computing task and one or more values corresponding to the attributes related to the given computing task. For example, a numerical representation of the given computing task may be a binary number including one or more attribute bits representative of an ordered list of the attributes of the computing task and one more priority bits representative of a priority of the given computing task. In some embodiments, the attribute bits and the priority bits may correspond to the lower-order bits and the higher-order bits of the binary number, respectively.

The mechanisms disclosed herein may sort the computing tasks in view of the numerical representations of the computing tasks and generate a priority queue including the sorted computing tasks. For example, the computing tasks may be sorted by their corresponding numerical representations (e.g., by performing a CPU integer comparison across the numerical representations of the computing tasks). In some embodiments, the sorting of the computing tasks may involve performing a single CPU operation. Since each of the numerical representations of the computing tasks includes a combination of priority bits and attribute bits of one of the computing tasks, sorting the computing tasks by their numerical representations may result in the computing tasks being sorted by their priority bits and that the computing tasks of the same priority bits being sorted by attribute bits. As such, the mechanisms can generate the priority queue in view of both the priorities and the attributes of the computing tasks efficiently.

To distribute a computing task to a processing unit of a computer system (e.g., a node, a container, etc.), the mechanisms disclosed herein can generate an attribute mask representing one or more attributes of the processing unit. The attribute mask may be any suitable numeral representation of the attributes. The attributes may include, for example, a compute resource that can be provided by the processing unit, a hardware capacity of the processing unit (e.g., presence of a graphics processing unit, presence of a network accelerator, etc.), and/or any other feature of the processing unit related to execution of one or more computing tasks. The attribute mask may be a binary representation of an ordered list of the attributes of the processing unit (e.g., a list of the attributes of the processing unit sorted by priority). The mechanisms can then identify a computing task in the priority queue in view of the attribute mask. For example, the mechanisms can iterate over the computing tasks in the priority queue and compare the attribute mask with the attribute bits of one or more of the computing tasks until a match between the attribute mask and the attributes of a particular computing task in the priority queue is identified. In some embodiments, the comparison between the attribute mask and the attribute bits of a computing task may be made by performing a bitwise AND operation.

The mechanisms can also detect one or more notification events that indicate that the computing tasks in the priority queue are not processed efficiently and may generate notifications accordingly. For example, the mechanisms can detect a notification event in response to determining that an average search depth for a predetermined number of processing units of the computer system is equal to or greater than a threshold. The average search depth may represent an average (e.g., a mean, median, etc.) of one or more queue search depths corresponding to one or more nodes of the computer system. Each of the queue search depths may be the number of computing tasks in the priority queue iterated before a computing task in the priority queue is identified for processing by a particular processing unit of the computer system. Upon detecting one or more of the notification events, the mechanisms can generate a notification indicative of the detection of the notification event(s). The mechanisms can also identify the attributes of the computing tasks relating to the notification event(s) (e.g., by performing a single bitwise AND operation of the numerical representations of the computing tasks under the threshold) and provide information of the attributes (e.g., the identification of the attributes) in the notification. As such, the mechanisms can provide precise automatic notifications of the attributes related to the notification events and can protect the priority queue from filling up with computing tasks that cannot be run. This may reduce human intervention required to handle a stale priority queue and may enable automatic allocation of computer resources in view of the notification events.

Accordingly, aspects of the present disclosure provide for scheduling mechanisms that can schedule computing tasks for a heterogeneous computing environment. Compared to the prior solutions for scheduling computing tasks that utilize separate priority queues for various attributes of processing units, the mechanisms can schedule computing tasks related to different attributes of processing units more efficiently using a priority queue. By utilizing numerical representations of attributes and priorities of the computing tasks, the mechanisms disclosed herein can generate the priority queue in view of both the priorities and the attributes of the computing tasks in an efficient manner by performing a single CPU operation. Moreover, the mechanisms can compare attributes of a processing unit with attributes of a computing task by performing a bitwise AND operation and can thus schedule computing tasks with enhanced and/or optimized efficiency.

FIG. 1A is a block diagram that illustrates an embodiment of a computer system 100A in which embodiments of the present invention may operate. The computer system 100A may be a server, a workstation, a personal computer (PC), a mobile phone, a personal digital assistant (PDA), or any other suitable computing device. The computer system 100A runs an operating system (OS) 101 to manage its resources, such as one or more processors 103 communicatively coupled to memory devices 105, and I/O devices 107. The computer system 100A runs one or more processes. Each of the processes may be a program or a thread of a multi-threaded program. Each of the processes may be a user-space process or a system-level process. Further, each of the processes may run on the host (e.g., the computer system 100A) or on a virtual machine hosted by the computer system 100A. In some embodiments, computer system 100A may be and/or include a computer system 900 as described in connection with FIG. 9.

Examples of "processors" (also referred herein as "processing devices" or CPUs) include various devices that are capable of executing instructions encoding arithmetic, logical, or I/O operations. In an illustrative example, a processor may follow Von Neumann architectural model and may include an arithmetic logic unit (ALU), a control unit, and a plurality of registers. In another aspect, a processor may be a single core processor which is capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

Examples of "memory devices" include volatile or non-volatile memory devices, such as RAM, ROM, EEPROM, or any other devices capable of storing data. Examples of "I/O devices" include devices providing an interface between a processor and an external device capable of inputting and/or outputting binary data.

In some embodiments, the computer system 100A may be accessible by remote systems via a network 109. The network 109 may be a private network (e.g., a local area network (LAN), a wide area network (WAN), intranet, etc.) or a public network (e.g., the Internet).

As illustrated, the computer system 100A may include a scheduler component 142 that can schedule computing tasks for the computer system 100A and/or one or more computer systems managed by the computer system 100A. As referred to herein, a computing task may be any task that can be processed by one or more processing units of a computer system. Examples of the computing task may include executing a process, executing a software program, creating a container, deploying an application, hosting an application, deploying a virtual machine, migrating a virtual machine, etc. A processing unit of a computer system may be and/or include any component of a computer system, such as one or more processors, memory devices, network devices, virtual machines, host machines, nodes, containers, clouds, etc. In one implementation, the scheduler component 142 may be part of the OS 101. In another implementation, the scheduler component 142 may be implemented as a program that is not part of the OS 101.

As an example, the scheduler component 142 can schedule the use of CPU time, memory, and/or other compute resources by a plurality of processes. The scheduler component 142 may be part of the OS 101. In some embodiments, the processes may include one or more guest processes running on virtual machines. In such embodiments, the scheduler component 142 may be part of a hypervisor, which, in turn, may be part of the host OS 101. The hypervisor may also be known as a virtual machine monitor (VMM) or a kernel-based hypervisor. As will be discussed in more detail in connection with FIGS. 1B-5, the scheduler component 142 can schedule computing tasks to be processed by system 100A in view of attributes and priorities of the computing tasks.

Figure 1B:
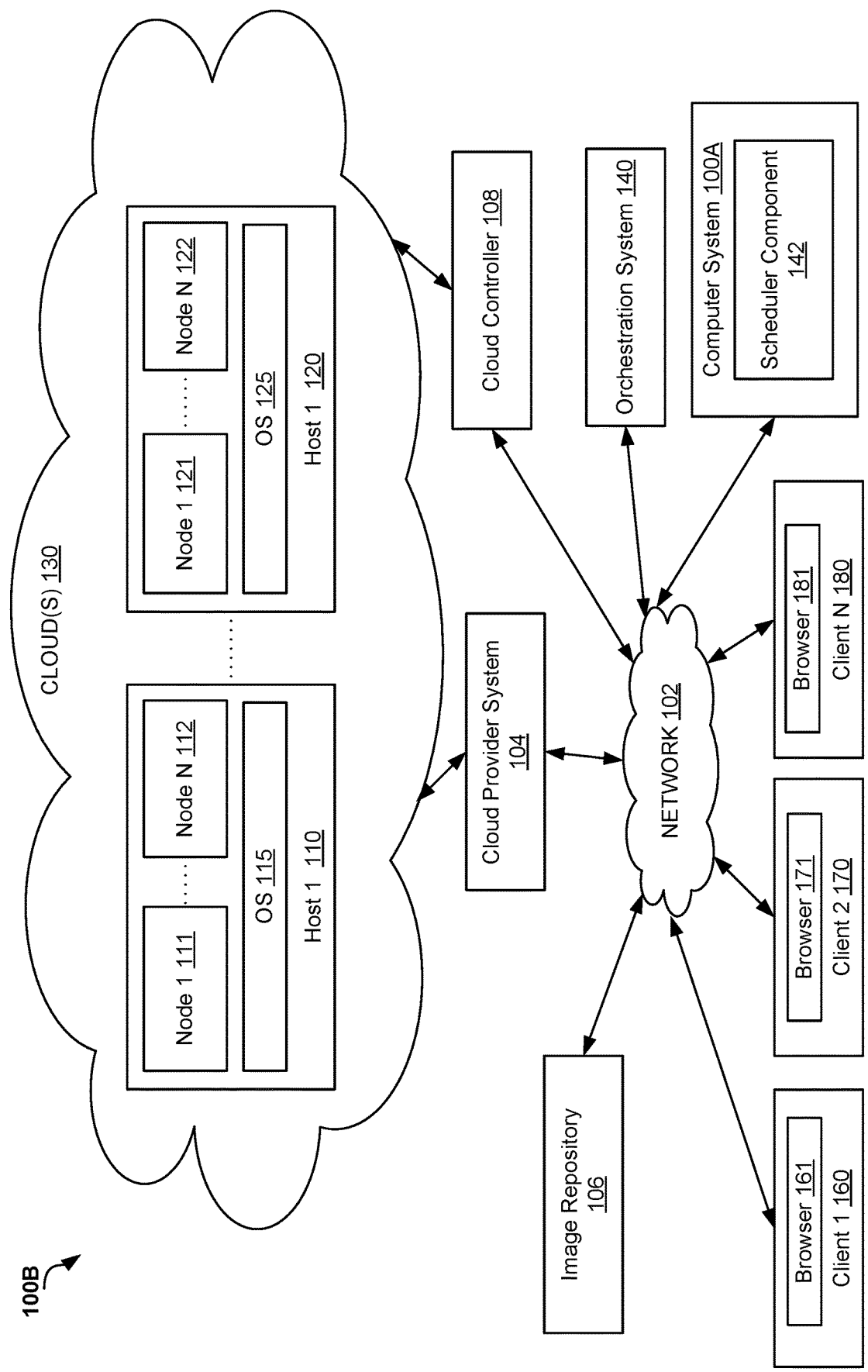

In some embodiments, the scheduler component 142 can schedule computing tasks for a network architecture as described in connection with FIG. 1B. As illustrated in FIG. 1B is a block diagram of a network architecture 100B in which implementations of the disclosure may operate. In some implementations, the network architecture 100B may be used in a Platform-as-a-Service (PaaS) system, such as OpenShift®. The PaaS system provides resources and services for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure.

As shown in FIG. 1B, the network architecture 100B may include a cloud-computing environment 130 (also referred to herein as a cloud) that includes nodes 111, 112, 121, 122 to execute applications and/or processes associated with the applications. A "node" providing computing functionality may provide the execution environment for an application of the PaaS system. In some implementations, the "node" may refer to a virtual machine (VM) that is hosted on a physical machine, such as host 1 110 through host N 120, implemented as part of the cloud 130. In some implementations, the host machines 110, 120 are often located in a data center. For example, nodes 111 and 112 are hosted on physical machine 110 in cloud 130 provided by cloud provider 104. When nodes 111, 112, 121, 122 are implemented as VMs, they may be executed by operating systems (OSs) 115, 125 on each host machine 110, 120.

In some implementations, the host machines 110, 120 may be located in a data center. Users can interact with applications executing on the cloud-based nodes 111, 112, 121, 122 using client computer systems, such as clients 160, 170, and 180, via corresponding web browser applications 161, 171, and 181. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In some embodiments, each of nodes 111, 112, 121, 122 can host one or more containers. Each of the containers may be a secure process space on the nodes 111, 112, 121 and 122 to execute functionality of an application and/or a service. In some implementations, a container is established at the nodes 111, 112, 121 and 122 with access to certain resources of the underlying node, including memory, storage, etc. In one implementation, the containers may be established using the Linux Containers (LXC) method, cgroups, SELinux™, and kernel namespaces, etc. A container may serve as an interface between a host machine and a software application. The software application may comprise one or more related processes and may provide a certain service (e.g., an HTTP server, a database server, etc.). Containerization is an operating-system-level virtualization environment of a host machine that provides a way to isolate the micro-service processes. At the same time, employing the containers makes it possible to develop and deploy new cloud-based micro-services in a cloud-based system.

Each of nodes 111, 112, 121, 122 can host one or more applications and/or services. Each of the services may correspond to an application and/or one or more components of the application and may provide one or more functionalities of the application. Examples of the services may include a web server, a database server, a middleware server, etc. Each of the services may run as an independent process in a suitable machine (e.g., a container, a virtual machine, a physical machine, etc.). A service running in system 100B may communicate with one or more other services in system 100B. In one implementation, an application may be deployed as one or more services on one or more nodes 111, 112, 121, 122. Each of the services may be deployed in one or more containers. In some implementations, a service may be an application.

Orchestration system 140 may provide management and orchestration functions for deploying and/or managing applications and/or services in system 100B. For example, orchestration system 140 can build one or more container images for providing functionality of the applications and/or the services. The orchestration system 140 can then create one or more containers to host the application and/or service (e.g., by instructing one or more nodes 111, 112, 121, 122 to instantiate one or more containers from the container image(s)). Orchestration system 140 can include one or more computer systems (e.g., a computer system as shown in FIGS. 2-5). Orchestration system 140 can implement an application programming interface to facilitate deployment, scaling, and/or management of containerized software applications. In some embodiments, orchestration system 140 can deploy an application as one or more services on one or more nodes. Each of the services may be deployed in one or more containers. In some embodiments, a replica of the service may be created by deploying one or more containers on a node.

The scheduler component 142 may schedule computing tasks 100B in view of attributes and priorities of the computing tasks. Each of the computing tasks may be and/or include any task that can be processed by a component of a computer system (e.g., system 100A and/or 100B), such as executing a process, executing a software program, creating a container, deploying a virtual machine, stopping a virtual machine, migrating a virtual machine, deploying an application, hosting an application, etc. Each of the attributes may be a feature of a processing unit required to process a computing task, such as a compute resource (e.g., a network resource, a processor resource, a memory resource, etc.). The processing unit may include one or more containers, virtual machines, host machines, nodes, and/or any other components of system 100B. In some embodiments, the attributes and/or the priorities of the computing tasks may be determined in view of configuration inputs provided by one or more users.

The scheduler component 142 can maintain a priority queue comprising a plurality of computing tasks sorted in view of their attributes and priorities. In some embodiments, the scheduler component 142 can generate numerical representations of the computing tasks in view of the attributes and the priorities of the computing tasks. For example, a numerical representation of the given computing task may be a binary number including one or more attribute bits representative of an ordered list of the attributes of the computing task and one more priority bits representative of a priority of the given computing task. In some embodiments, the attribute bits and the priority bits may correspond to the lower-order bits and the higher-order bits of the binary number, respectively.

The scheduler component 142 may sort the computing tasks in view of the numerical representations of the computing tasks and generate a priority queue including the sorted computing tasks. For example, the computing tasks may be sorted by priority bits. The computing tasks of the same priority bits may be sorted by attribute bits. The computing tasks may be sorted by performing a CPU integer comparison across the numerical representations of the computing tasks. As such, the scheduler component 142 can generate the priority queue in view of both the priorities and the attributes of the computing tasks in an efficient manner by performing a single CPU operation.

The scheduler component 142 can generate an attribute task representing one or more attributes of a processing unit to distribute a computing task to the processing unit. The processing unit may include any component of the system 100B (e.g., a node, a virtual machine, a host machine, etc.). The attributes of the processing unit may include, for example, a compute resource that can be provided by the processing unit and/or any other feature of the processing unit. The attribute task may be a numerical representation of an ordered list of the attributes of the processing unit (e.g., a list of the attributes of the processing unit sorted by priority).

The scheduler component 142 can then identify a computing task in the priority queue in view of the attribute mask. For example, the scheduler component 142 can apply the attribute mask to one or more computing tasks in the priority queue to identify a match between the attribute mask and one or more of the numerical representations of the computing tasks. The application of the attribute mask may include iterating over the computing tasks in the priority queue and comparing the attribute mask with the attribute bits of one of the computing tasks until a match between the attribute mask and the attributes of a particular computing task in the priority queue is identified. In some embodiments, the comparison between the attribute mask and the attribute bits of a computing task may be made by performing a bitwise AND operation. As such, the scheduler component 142 can perform the comparison with enhanced and/or optimized efficiency.

In some embodiments, the maximum search time for a computing task in the priority queue for a given processing unit of the system 100A and/or 100B may be O(n), where n represents the number of the computing tasks in the priority queue. The maximum search time may correspond to an implementation in which the scheduler component 142 iterates over each of the computing tasks in the priority queue because the given processing unit cannot run any of the computing tasks in the priority queue. In some embodiments, the scheduler component 142 may determine whether the given processing unit can process at least one of the computing tasks in the priority queue before iterating over a predetermine number of computing tasks in the priority queue (e.g., the first computing task in the priority queue, the first two computing tasks in the priority queue, etc.). For example, the scheduler component 142 can use a Bloom filter to determine at O(1) if the priority queue contains at least one computing task that can be run by the given processing unit.

In some embodiments, upon identifying the computing task that can be processed by the processing unit, the scheduler component 142 can distribute the identified computing task to the processing unit and can remove the identified computing task from the priority queue.

The scheduler component 142 can also detect one or more notification events indicating that the computing tasks in the priority queue are not processed efficiently and may generate one or more notifications accordingly. As an example, such a notification event may indicate that the number of processing units that can process computing tasks of certain attributes is less than and/or equal to a threshold (e.g., zero, one, two, etc.). More particularly, for example, one or more of the computing tasks in the priority queue may require a certain attribute (e.g., a certain graphics processing unit, a certain network accelerator, etc.). The priority queue may be stale when none (or a very few) of the processing units of system 100A and/or 100B have the attribute.

In some embodiments, the scheduler component 142 can detect a notification event in response to determining that an average search depth for a predetermined number of processing units of the computer system is equal to or greater than a threshold (also referred to as the "queue search depth threshold"). The average search depth may represent an average (e.g., a mean, median, etc.) of one or more queue search depths corresponding to the predetermined number of processing units. Each of the queue search depths may be the number of computing tasks in the priority queue iterated over before a computing task in the priority queue is identified for processing by a particular processing unit.

The scheduler component 142 can also identify one or more computing tasks related to the notification event and/or attributes related to the computing tasks related to the notification event. For example, the scheduler component 142 can identify the computing tasks in the priority queue with positions under the queue search depth threshold (e.g., the first three computing tasks in some embodiments in which the query search depth threshold is three). The scheduler component 142 can also identify one or more attributes related to the identified computing tasks as the attributes relating to the notification event (e.g., by performing a bitwise AND of the numerical representations of the identified computing tasks.)

Upon detecting one or more of the notification events, the scheduler component 142 can generate a notification indicative of the detection of the notification event(s). The notification may also include information of the attributes relating to the notification event(s) (e.g., the identification of the attributes). In some embodiments, the scheduler component 142 can transmit the notification to another device that can control the attributes of the processing units in system 100A and/or 100B. For example, the notification may be transmitted to the cloud controller 108. Upon receiving the notification, the cloud controller 108 can add one or more processing units of the attributes related to the notification event(s) to cloud(s) 130. As such, the scheduler component 142 can provide precise notifications of the attributes related to the notification events and can protect the priority queue from filling up with computing tasks that cannot be run by system 100A and/or 100B. This may reduce human intervention required to handle a stale priority queue and may enable automatic allocation of resources in system 100A and/or 100B.

In some embodiments, the scheduler component 142 can include one or more components described in connection with FIGS. 2-5 and can implement one or more methods described in connection with FIGS. 6-8.

While various implementations are described in terms of the environment described above, the facility may be implemented in a variety of other environments including a single, monolithic computer system, as well as various other combinations of computer systems or similar devices connected in various ways. For example, the scheduler component 142 and/or one or more portions of the scheduler component 142 may be running on a node, such as nodes 111, 112, 121, 122, of the system 100B hosted by cloud 130, or may execute external to cloud 130 on a separate server device. In some implementations, the scheduler component 142 may include more components than what is shown that operate in conjunction with the PaaS system of network 100B.

Figure 2:
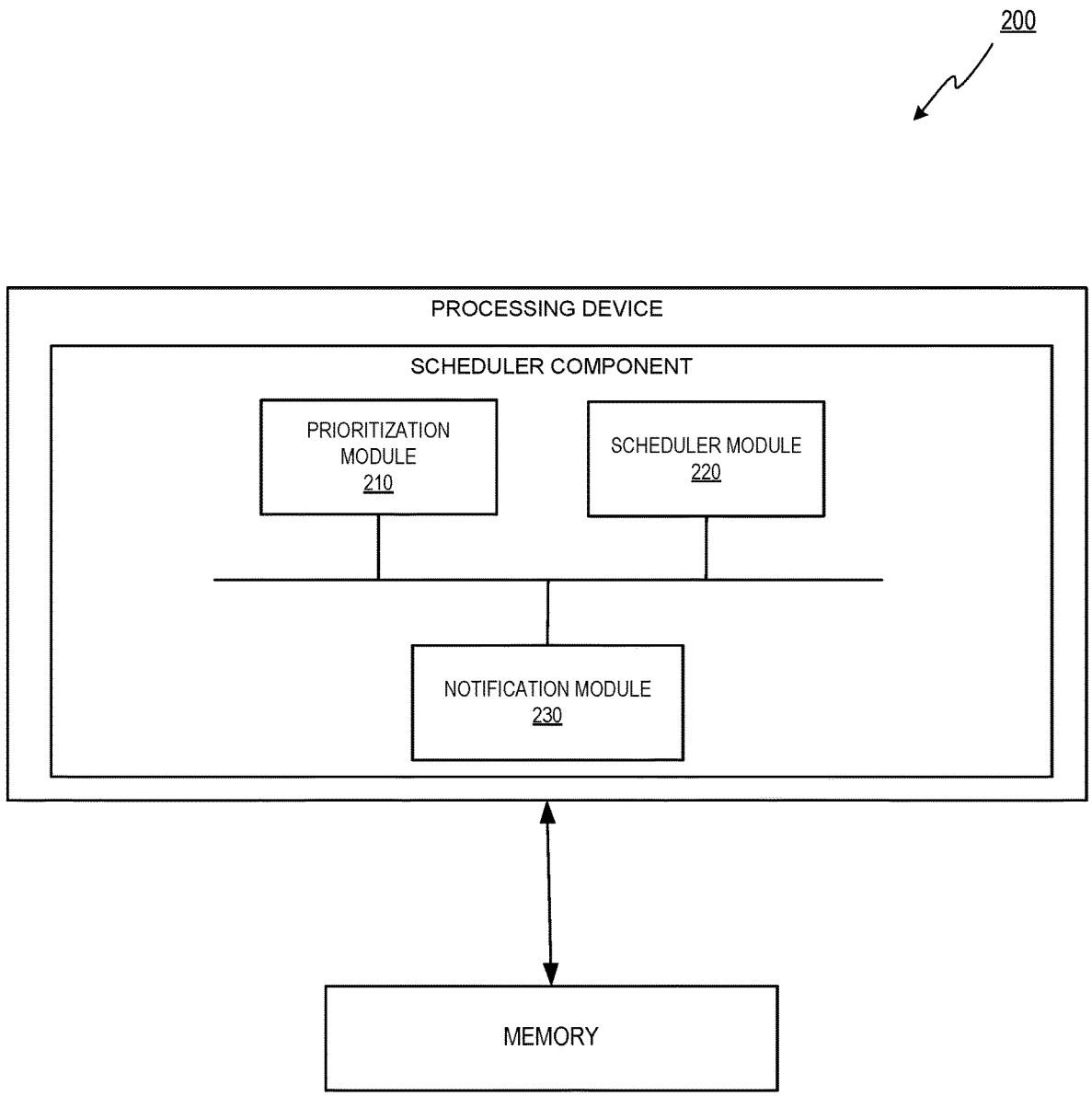
FIG. 2 is a block diagram of a detailed view of a computer system implementing a scheduler component according to an implementation of the disclosure.

FIG. 2 depicts a block diagram illustrating an example 200 of a computer system in accordance with some implementations of the disclosure. The scheduler component of FIG. 2 may be the same as the scheduler component 142 of FIG. 1. As illustrated, the scheduler component may include a prioritization module 210, a scheduler module 220, and a notification module 230. More or less components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

The prioritization module 210 can prioritize computing tasks to be processed in view of their corresponding attributes and/or priorities. Each of the attributes may be a feature of a processing unit required to process the computing task, such as a compute resource (e.g., a network resource, a processor resource, a memory resource, etc.) that can be provided by the processing unit, a hardware capacity of the processing unit (e.g., presence of a graphics processing unit, presence of a network accelerator, etc.), and/or any other feature of the processing unit related to execution of the computing task (e.g., a security feature, etc.). For example, the prioritization module 210 can generate a priority queue of a plurality of computing tasks to be processed by one or more computer systems. The priority queue may include a plurality of elements. Each of the elements of the priority queue corresponds to one of the computing tasks. The elements of the priority queue may be arranged in an order. The computing tasks may be processed according to the order.

The order of the elements and/or the computing tasks in the priority queue may be determined in view of attributes related to the computing tasks and/or priorities of the computing tasks. For example, the prioritization module 210 can sort the computing tasks in view of a plurality of numerical representations of total priorities of the computing tasks. The total priorities may indicate the priorities of the computing tasks, the attributes associated with each of the computing tasks, and/or priorities of the attributes. Each of the numerical representations of the total priorities may include one or more values corresponding to a priority of a given computing task and one or more values corresponding to the attributes related to the given computing task. For example, a first portion of a given numerical representation of a total priority of a computing task may include one or more values (e.g., bits) corresponding to one or more attributes related to the computing task. A second portion of the given numerical representation may include one or more values (e.g., bits) corresponding to a priority of the computing task. In some embodiments, the first portion and the second portion of the given numerical representation of the total priority of the computing task may include a first plurality of bits (e.g., one or more lower-order bits) and a second plurality of bits (e.g., one or more higher-order bits), respectively.

To generate the numerical representations of the total priorities of the computing tasks, the prioritization module 210 can identify, for each respective computing task of the computing tasks, one or more attributes related the respective computing task. The prioritization module 210 can generate a numerical representation (also referred to as the "first numerical representation") of the attributes. For example, the prioritization module 210 can sort the attributes to generate an ordered list of the attributes. For example, the prioritization module 210 can determine priorities associated with the attributes and sort the attributes in view of the priorities. The prioritization module 210 can assign a value to each of the sorted attributes. The value may be an integer or any other suitable value that may represent an attribute related to the computing task. The prioritization module 210 can generate a combination of the values of the sorted attributes as the first numerical representation. In some embodiments, the first numerical representation may be and/or a binary representation of the attributes and may include a plurality of bits representing the attributes. The bit positions of the bits may correspond to the priorities associated with the attributes. For example, a higher-order bit position of the first numerical representation may correspond to an attribute of a higher priority while a lower-order bit position of the first numerical representation may correspond to an attribute of a lower priority.

The prioritization module 210 can also generate one or more representations of the priorities of the computing tasks. For example, the prioritization module 210 can assign various values to the priorities of the computing tasks. The prioritization module 210 can generate, for a respective computing task of the computing tasks, a numerical representation of a priority associated with the respective computing task (also referred to as the "second numerical representation"). In some embodiments, the second numerical representation may include one or more bits indicative of the priority of the respective computing task.

The prioritization module 210 can further generate a numerical representation of a total priority of the computing task (also referred to as the "third numerical representation") in view of the first numerical representation of the computing task and the second numerical representation of the computing task. The third numerical representation of the computing task may correspond to a combination of the first numerical representation of the attributes of the computing task and the second numerical representation of the priority of the computing task. For example, the third numerical representation of the computing task may include a plurality of bits. One or more of the bits (e.g., the higher-order bits) may correspond to the second numerical representation of the computing task. One or more of the bits (e.g., the lower-order bits) may correspond to the first numerical representation of the computing task.

The scheduler module 220 can schedule the computing tasks using the priority queue. For example, the scheduler module 220 can iterate the priority queue to identify a computing task of the priority queue that can be processed by a processing unit of a computer system. The scheduler modular 220 can generate an attribute mask in view of one or more attributes of the processing unit. Examples of the attributes of the processing unit may include a compute resource that can be provided by the processing unit (e.g., a processor resource, a memory resource, a network resource, etc.), a security feature of the processing unit, and/or any other feature of the processing unit. The attribute mask may be a numerical representation of an ordered list of the attributes of the processing unit. The numerical representation of the attributes of the processing unit may include values representing the attributes arranged in an order indicative of priorities of the attributes. For example, the attribute mask may include one or more bits representing the attributes of the processing unit. The bit positions of the bits may correspond to the priorities of the attributes of the processing unit. In some embodiments, a first bit position of the first numerical representation of the attributes may correspond to a first attribute of a first priority. A second bit position of the first numerical representation of the attributes may correspond to a second attribute of a second priority. In some embodiments in which the first priority is higher than the second priority, the first bit position may be higher than the second bit position. In some embodiments, the priorities of the attributes of the processing unit may correspond to the priorities of attributes of a computing task in the priority queue. For example, both of the first bit position of the attribute mask and the first bit position of the first numerical representation of the computing task may correspond to the first attribute. Both of the second bit position of the attribute mask and the second bit position of the first numerical representation of the computing task may correspond to the second attribute. In some embodiments, the computing task may relate to one or more attribute while the processing unit does not possess such attributes. For example, the first numerical representation of the computing task may include a third bit position of a third value corresponding to a third attribute. In some embodiments in which the processing unit does not possess the third attribute, a third bit position of the attribute mask may include a value that is different from the third value to indicate that the absence of the third attribute from the processing unit.

The notification module 230 can detect one or more notification events that indicate that the computing tasks in the priority queue are not processed efficiently and may generate notifications accordingly. As an example, the notification module 230 can detect a notification event in response to determining that the number of processing units of the computer system that can process a certain computing task or computing tasks of certain attributes is equal to or less than a threshold. As another example, the notification module 230 can detect a notification event in response to determining that an average search depth for a predetermined number of processing units of the computer system is equal to or greater than a threshold (also referred to as the "queue search depth threshold"). The average search depth may represent an average (e.g., a mean, median, etc.) of one or more queue search depths corresponding to one or more processing units of the computer system. Each of the queue search depths may be the number of computing tasks in the priority queue iterated before a computing task in the priority queue is identified for processing by a particular processing unit of the computer system (e.g., the number of applications of the attribute mask associated with the particular processing unit to identify the computing task). As still another example, the notification module 230 can detect a notification event in response to determining that the length of the priority queue (e.g., the number of the computing tasks in the priority queue) is greater than a threshold.

Upon detecting one or more of the notification events, the notification module 230 can generate a notification. The notification may include information indicative of the detection of the notification event(s). The notification may also include information of the computing tasks relating to the notification event(s), such as the attributes of the computing tasks relating to the notification event(s). In some embodiments, the notification module 230 can identify the attributes of the computing tasks relating to the notification event(s) by performing a bitwise operation (e.g., a single bitwise AND) of the numerical representations of the computing tasks under the queue search depth threshold. In some embodiments, the notification may be transmitted to a component that can allocate resources for the computer system or any other device that can handle the notification.

Figure 3:
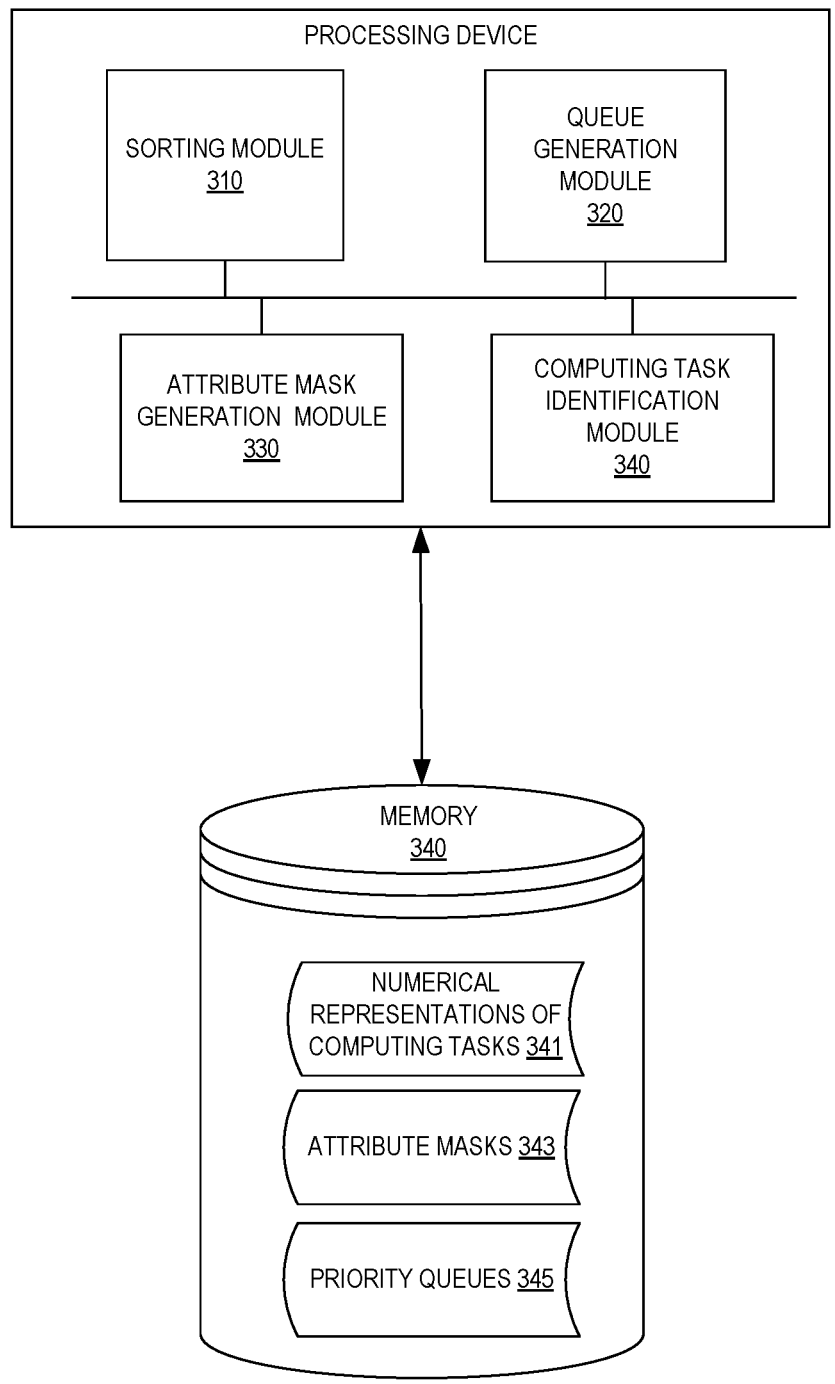
FIGS. 3, 4, and 5 depict block diagrams of example computer systems operating in accordance with one or more aspects of the present disclosure.
Figure 4:
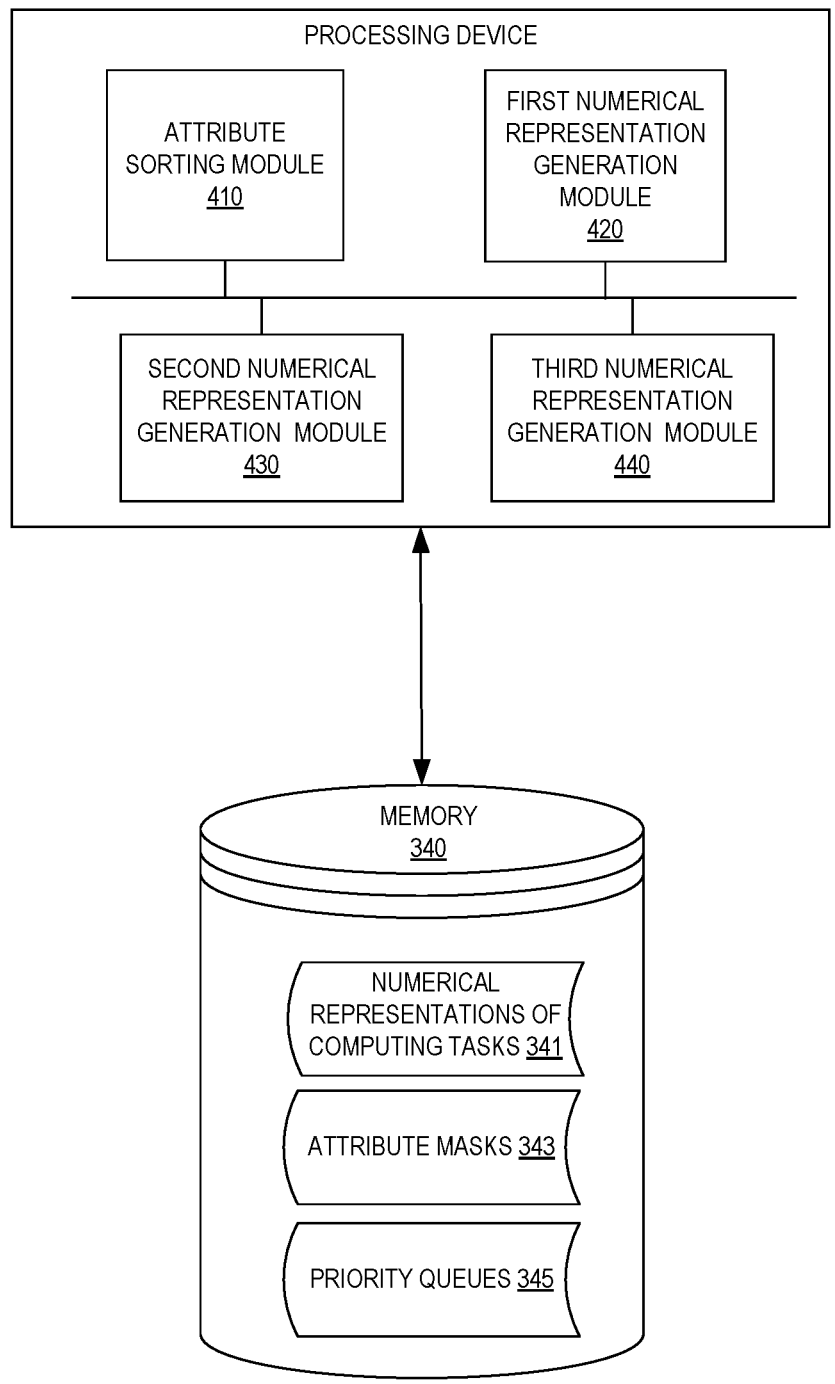
Figure 5:
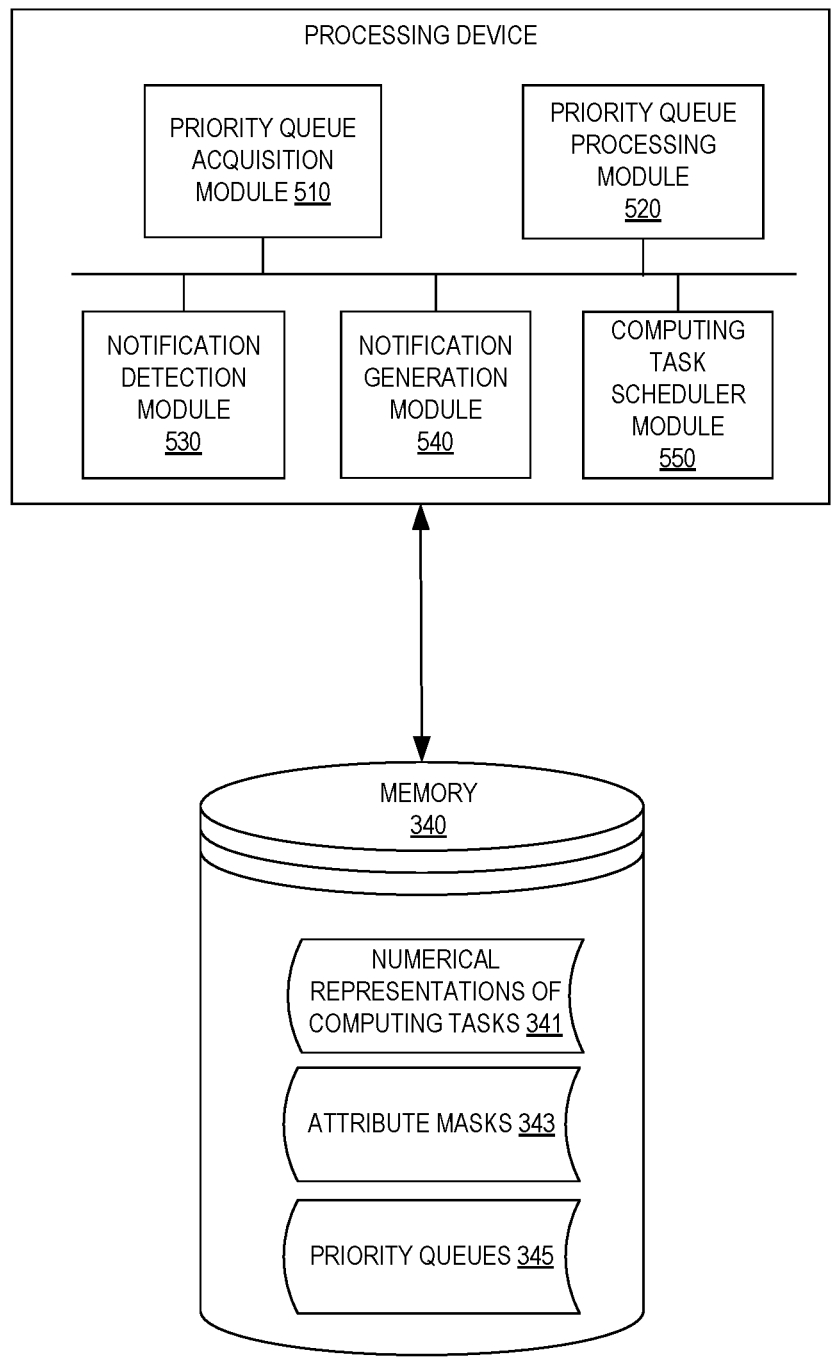

FIGS. 3, 4, and 5 depict block diagrams of example computer systems operating in accordance with one or more aspects of the present disclosure. Each of computer systems 300, 400, and 500 may be the same or similar to computer system 100B and may include one or more processing devices and one or more memory devices. Each of computer systems 300, 400, and 500 may further include a memory 310 storing numerical representations of computing tasks 341, attribute masks 343, priority queues 345, and/or any other suitable data in accordance with the present disclosure.

Referring to FIG. 3, computer system 300 may include a sorting module 310, queue generation module 320, an attribute mask generation module 330, and a computing task identification module 340.

The sorting module 310 can sort computing tasks to be processed in view of priorities of the computing tasks, attributes related to the computing tasks, priorities of the attributes, and/or may other information related to the computing tasks. For example, the sorting module 310 can sort the computing tasks in view of the priorities of the computing tasks. The sorting module 310 can then sort the computing tasks of the same priority in view of their corresponding attributes. More particularly, for example, the sorting module 310 can sort the computing tasks in view of numerical representations of priorities associated with the computing tasks. Each of the numerical representations may indicate a total priority associated with a respective computing task of the computing tasks. The total priority may represent a combination of a priority of the respective computing task and priorities of one or more attributes related to the respective computing task. In some embodiments, each of the numerical representations of the computing tasks may include a first portion corresponding to one or more attributes of the respective computing task (e.g., attributes required to perform the computing task) and a second portion corresponding to a priority of a respective computing task of the computing tasks. The first portion of the numerical representation may be and/or include a numerical representation of an ordered list of the attributes related to the computing task (e.g., one or more attribute bits). The second portion of the numerical representation may be and/or include a numerical representation of the priority of the computing task (e.g., one or more priority bits). In some embodiments, the attribute bits and the priority bits of a numerical representation of a computing task may correspond to the higher-order bits and the lower-order bits of the numerical representation, respectively. Sorting the computing tasks may include a CPU integer comparison across the numerical representations. The sorting may be performed in a single CPU operation in some embodiments.

The queue generation module 320 may generate one or more priority queues in view of the total priorities of the computing tasks. For example, the queue generation module 320 may generate a priority queue of the sorted computing tasks produced by the sorting module 310. The priority queue may include a plurality of elements. Each of the elements of the priority queue corresponds to one of the sorted computing tasks. The elements of the priority queue may be arranged in an order that corresponds to the sorted order of the computing tasks.

The attribute mask generation module 330 can generate one or more attribute masks for one or more processing units of a computer system. For example, the attribute mask generation module 330 can generate a first attribute mask for a first processing unit of the computer system. The first attribute mask may be and/or include a numerical representation of an ordered list of one or more attributes of the first processing unit. The first attribute mask may include one or more values (e.g., bits) representing an ordered list of the attributes. As an example, a first value (e.g., a first bit at a first bit position of a binary number) and a second value (e.g., a second bit at a second bit position of the binary number) may represent a first attribute of a first priority and a second attribute of a second priority, respectively. The first bit position may be higher than the second bit position in some embodiments in which the first priority is higher than the second priority.

The computing task identification module 340 may identify one or more computing tasks in the priority queue generated by the queue generation module 320 for processing by a processing unit of the computer system. For example, to identify a computing task that can run on the first processing unit, the computing task identification module 340 can apply the first attribute mask to one or more of the numerical representations of the computing tasks in the priority queue. The application of the first attribute mask to a given numerical representation of a computing task may include compare the first attribute mask with the first portion of the given numerical representation (e.g., the attribute bits) to determine if the first attribute mask matches the first portion of the given numerical representation. The first attribute mask can be applied to the numerical representations of the computing tasks iteratively in the sorted order of the computing tasks in the priority queue until a match is found.

Referring to FIG. 4, computer system 400 may include an attribute sorting module 410, a first numerical representation generation module 420, a second numerical representation generation module 430, and a third numerical representation generation module 440.

The attribute sorting module 410 can sorting one or more attributes associated with a computing task and can generate an ordered list of the attributes. The attribute sorting module 410 can sort the attributes in view of priorities associated with the attributes. The priorities of the attributes may be determined in view of configuration of the computing task.

The first numerical representation generation module 420 can generate a numerical representation of the computing task (also referred to as the "first numerical representation of the computing task") in view of the ordered list of the attributes. For example, the first numerical representation generation module 420 can assign a value to each of the sorted attributes. The value may be an integer value or any other suitable value that can represent an attribute of the computing task. In some embodiments, the first numerical representation generation module 420 can map the ordered list of the attributes to one or more bits (also referred to as the "attribute bits"). The bit positions of the bits may correspond to the priorities of the attributes. For example, the higher-order bits of the first numerical representation may correspond to attributes of higher priorities while the lower-order bits of the first numerical representation may correspond to attributes of lower priorities.

The second numerical representation generation module 430 can generate a numerical representation of the computing task (also referred to as the "second numerical representation of the computing task") in view of a priority of the computing task. For example, the second numerical representation of the computing task may include one or more values representing the priority of the computing task. In one implementation, the second numerical representation of the computing task may include one or more bits (also referred to as the "priority bits").

The third numerical representation generation module 440 can generate a numerical representation of the computing task (also referred to as the "third numerical representation of the computing task") in view of the first numerical representation of the computing task and the second numerical representation of the computing task. For example, the third numerical representation generation module 440 can determine a combination of the first numerical representation of the computing task and the second numerical representation of the computing task as the third numerical representation of the computing task. The third numerical representation of the computing task may be, for example, a combination of the attribute bits and the priority bits. The attribute bits and the priority bits may correspond to the lower-order bits and the higher-order bits of the third numerical representation of the computing task, respectively.

Referring to FIG. 5, computer system 500 may include a priority queue acquisition module 510, a priority queue processing module 520, a notification detection module 530, a notification generation module 540, and a computing task scheduler module 550.

The priority queue acquisition module 510 can acquire one or more priority queues of computing tasks to be processed by one or more computer systems. Each of the priority queues may include a plurality of elements corresponding to a plurality of sorted computing tasks. In one implementation, the priority queue acquisition module 510 can acquire the priority queues by generating the priority queues in accordance with the present disclosure. In another implementation, the priority queue acquisition module 510 can acquire the priority queues from a memory storing the priority queue (e.g., memory 340 storing priority queues 345) or any other device that is capable of providing the priority queues.

The priority queue processing module 520 can process the priority queues to identify computing tasks that can be processed by one or more processing units of a computer system. For example, to identify a computing task that can run on a first processing unit of the computer system, the priority queue processing module 520 can apply a first attribute mask associated with the first processing unit to one or more of the numerical representations of the computing tasks in the priority queue. The application of the first attribute mask to a given numerical representation of a computing task may include compare the first attribute mask with the first portion of the given numerical representation (e.g., the attribute bits) to determine whether the first attribute mask matches the first portion of the given numerical representation. The first attribute mask can be applied to the numerical representations of the computing tasks iteratively in the sorted order of the computing tasks in the priority queue until a match is found.

The notification detection module 530 can detect one or more notification events that indicate that the computing tasks in a priority queue are not processed efficiently. The notification detection module 530 may detect a notification event in response to determining that the number of processing units of the computer system that can process a certain computing task or computing tasks of certain attributes is equal to or less than a threshold, that an average search depth for a predetermined number of processing units of the computer system is equal to or greater than a threshold (also referred to as the "average queue search depth threshold"), that the length of the priority queue (e.g., the number of the computing tasks in the priority queue) is greater than a threshold, etc.

Upon detecting one or more of the notification events, the notification generation module 540 can generate a notification. The notification may include information indicative of the detection of the notification event(s). The notification may also include information of the computing tasks relating to the notification event(s), such as the attributes of the computing tasks relating to the notification event(s). In some embodiments, the notification generation module 540 can identify the attributes of the computing tasks relating to the notification event(s) by performing a bitwise operation (e.g., a single bitwise AND) of the numerical representations of the computing tasks under the average queue search depth threshold. In some embodiments, the notification may be transmitted to a component of the computer system that can allocate resources for the computer system.

The computing task scheduler module 550 can distribute the identified computing task to the processing unit of the computer system for processing.

Figure 6:
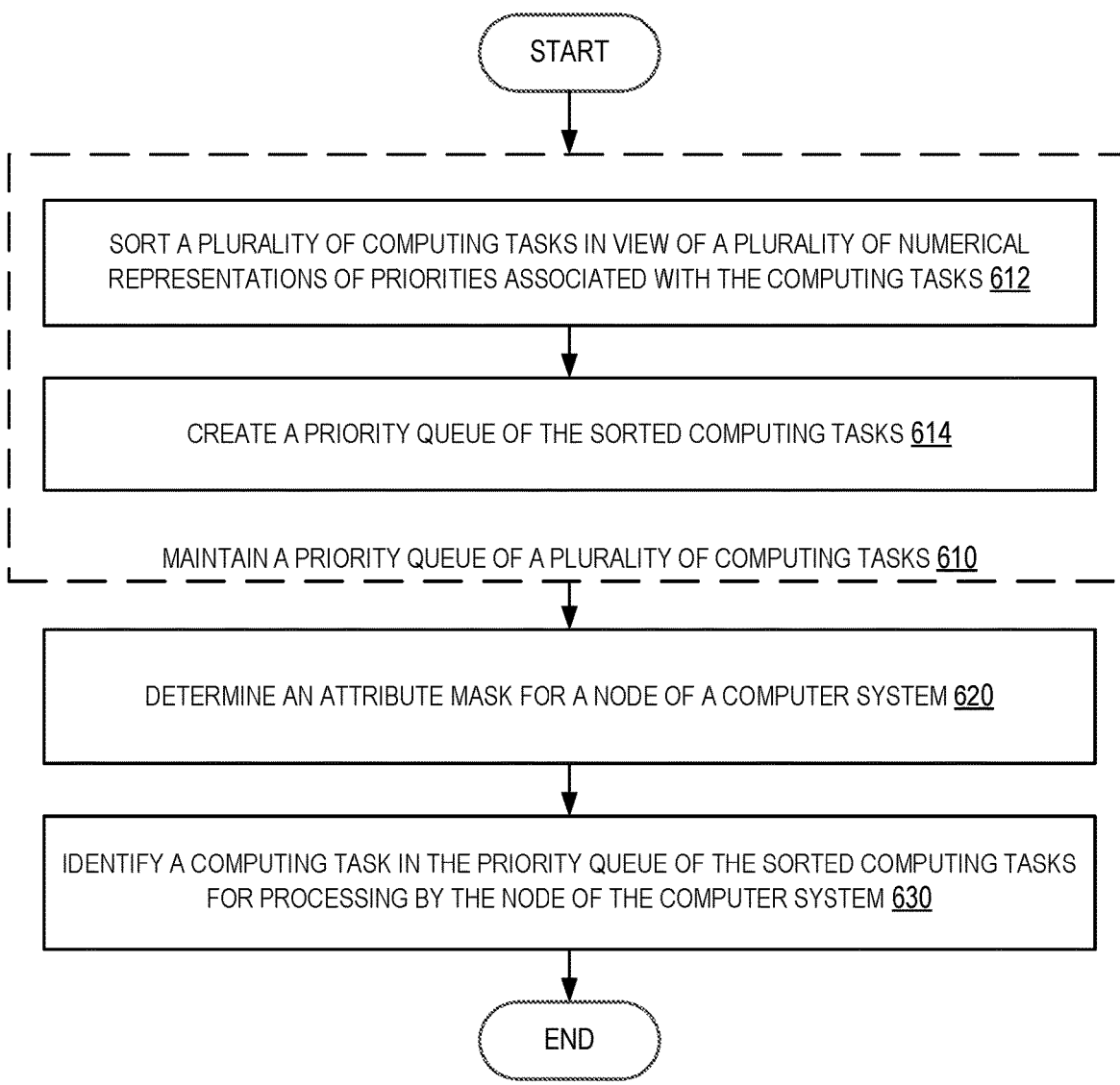
FIG. 6 is a flow diagram illustrating a method for scheduling computing tasks in a computer system in accordance with some embodiments of the present disclosure.
Figure 7:
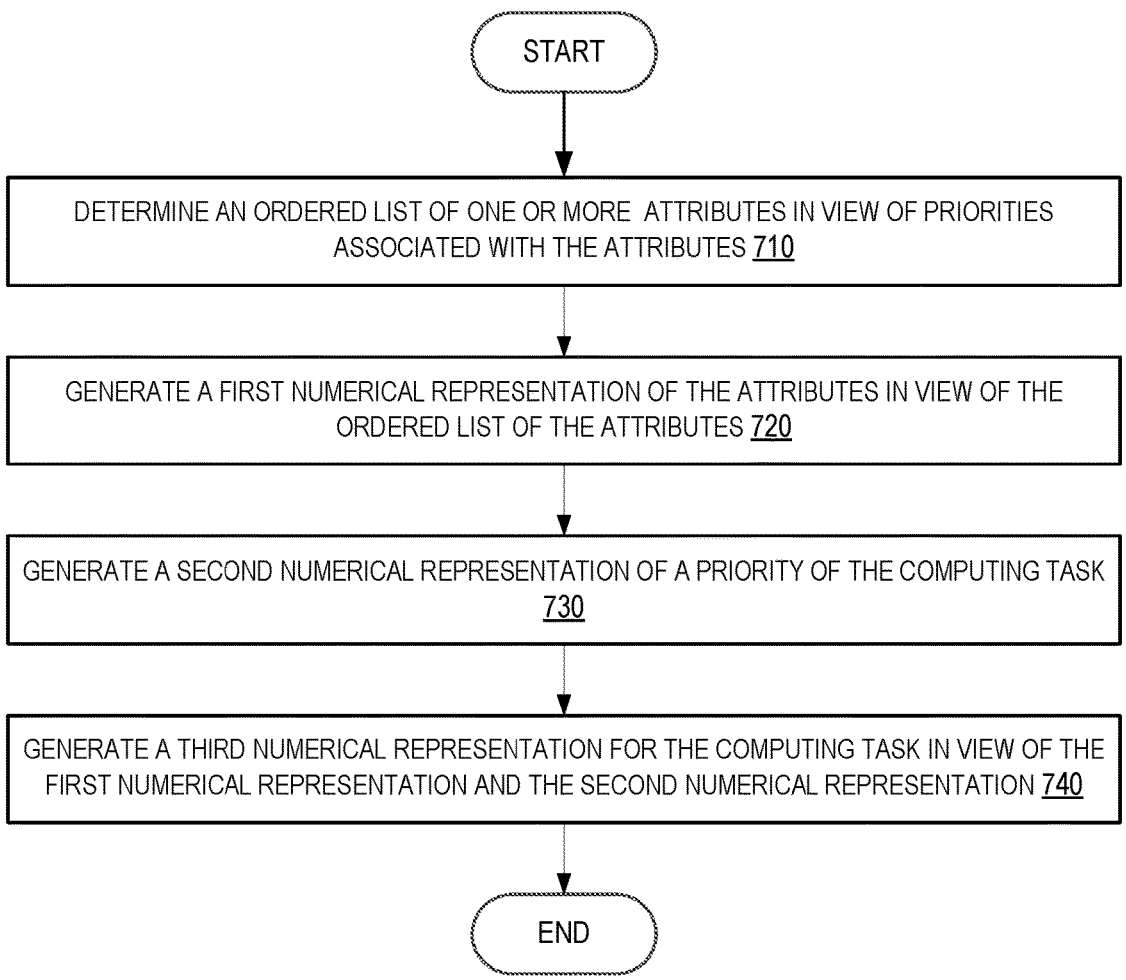
FIG. 7 is a flow diagram illustrating a method for prioritizing computing tasks in accordance with some embodiments of the present disclosure.
Figure 8:
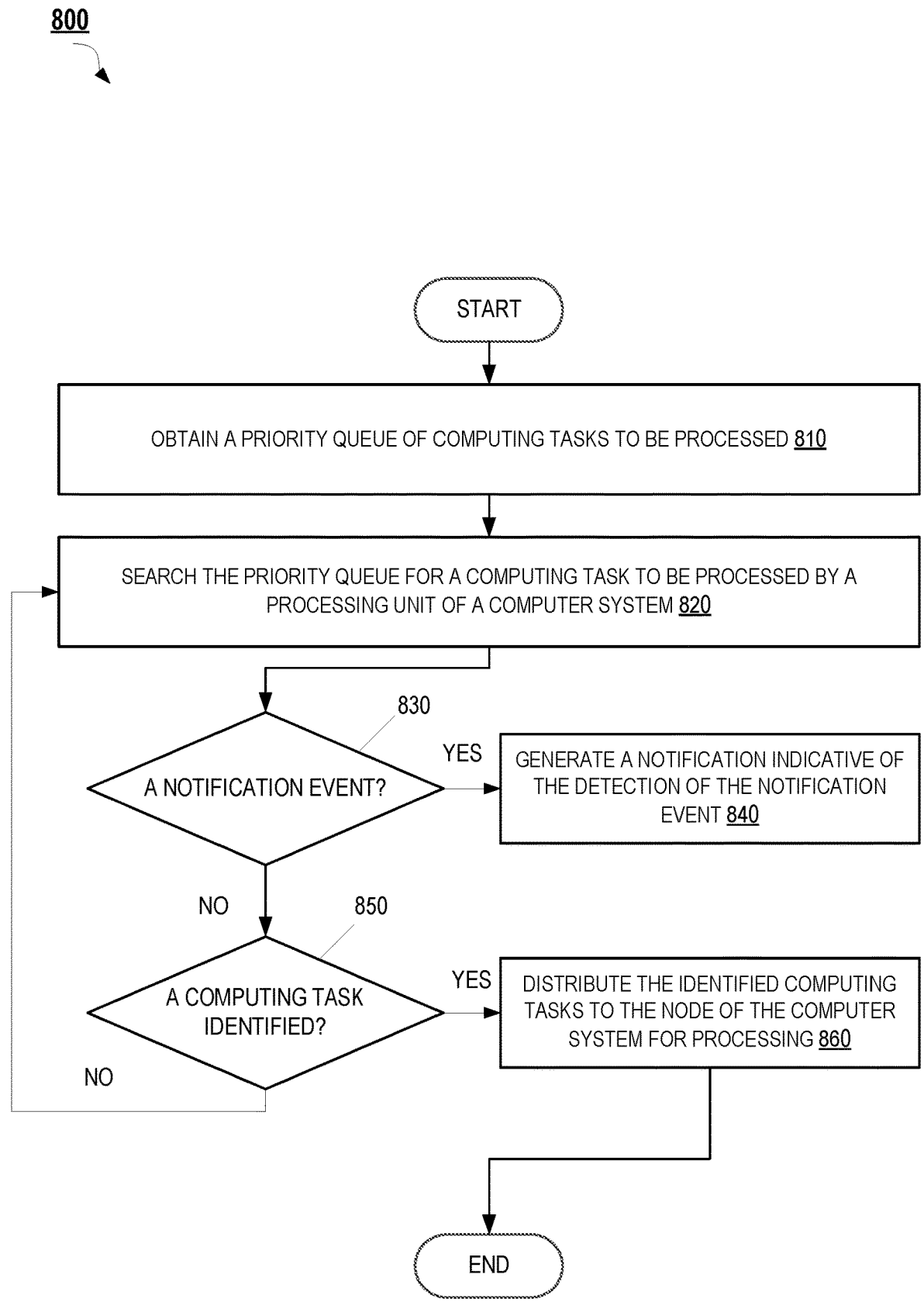
FIG. 8 is a flow diagram illustrating a method for managing a priority queue in accordance with some embodiments of the present disclosure.

FIGS. 6, 7, and 8 are flow diagrams illustrating methods 600, 700, and 800 for memory management in a virtualized computer system in accordance with one or more aspects of the present disclosure. Method 600 illustrates an example process for scheduling computing tasks in a computer system in accordance with some embodiments of the present disclosure. Method 700 illustrates an example process for prioritizing computing tasks in accordance with some embodiments of the present disclosure. Method 800 illustrates an example process for managing a priority queue in accordance with some embodiments of the present disclosure. Methods 600, 700, and 800 may be performed by processing devices that may comprise hardware (e.g., circuitry, dedicated logic, programmable logic, microcode, etc.), executable code (such as is run on a general-purpose computer system or a dedicated machine), or a combination of both. Methods 600, 700, and 800 and each of their individual functions, routines, subroutines, or operations may be performed by one or more processors of the computer device executing the method. In certain implementations, methods 600, 700, and 800 may each be performed by a single processing thread. Alternatively, methods 600, 700, and 800 may be performed by two or more processing threads, each thread executing one or more individual functions, routines, subroutines, or operations of the method. In an illustrative example, the processing threads implementing methods 600, 700, and 800 may be synchronized (e.g., using semaphores, critical sections, and/or other thread synchronization mechanisms). Alternatively, the processes implementing methods 600, 700, and 800 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 600, 700, and 800 may be performed by computer system 100A and/or 100B as shown in FIGS. 1A-1B.

Refereeing to FIG. 6, method 600 begins at block 610 where the processing device may maintain a priority queue comprising a plurality of computing tasks sorted in view of a plurality of numerical representations of priorities associated with the plurality of computing tasks. In some embodiments, a first portion of each of the plurality of numerical representations corresponds to a priority of a respective computing task of the plurality of computing tasks. A second portion of each of the plurality of numerical representations corresponds to one or more attributes of the respective computing task of the plurality of computing tasks. The priority queue may be maintained, for example, by performing one or more operations depicted in blocks 612 and 614.

At block 612, the processing device can sort the plurality of computing tasks in view of the numerical representations of the computing tasks. Each of the numerical representations may indicate a total priority associated with one of the computing tasks. In some embodiments, each of the numerical representations may include a first portion corresponding to one or more attributes of the respective computing task (e.g., attributes required to perform the computing task) and a second portion corresponding to a priority of a respective computing task of the computing tasks. The first portion of the numerical representation may be and/or include a numerical representation of an ordered list of the attributes related to the computing task. The first portion of the numerical representation may include one or more bits representing the ordered list of the attributes (e.g., the attribute bits). The second portion of the numerical representation may be and/or include a numerical representation of the priority of the computing task. The second portion of the numerical representation may include one or more bits indicating the priority of the computing task (e.g., the priority bits). In some embodiments, the first portion of the numerical representation corresponds to one or more lower-order bits of the numerical representation of the computing task while the second portion of the numerical representation corresponds to one or more higher-order bits of the numerical representation of the computing task. The numerical representations may be generated, for example, by performing one or more operations described in connection with FIG. 7.

The processing device can sort the computing tasks in view of the first portion and/or the second portion of each of the numerical representations. For example, the processing device can sort the computing tasks by priority bits. The computing tasks of the same priority bits may be sorted by attribute bits. Sorting the computing tasks may include a CPU integer comparison across the numerical representations. The sorting may be performed in a single CPU operation in some embodiments.

At block 614, the processing device can create a priority queue of the sorted computing tasks. The priority queue may include a plurality of elements. Each of the elements of the priority queue corresponds to one of the sorted computing tasks. The elements of the priority queue may be arranged in an order that corresponds to the sorted order of the computing tasks. The computing tasks may be processed according to the order.

At block 620, the processing device can determine an attribute mask for a processing unit of a computer system. The attribute mask may include a numerical representation of one or more attributes of the processing unit. For example, the attribute mask may include one or more bits representing an ordered list of the attributes of the processing unit. In some embodiments, a higher-order bit and a lower-order bit of the attribute mask may correspond to an attribute of a higher priority and an attribute of a lower priority, respectively.

At block 630, the processing device can identify a computing task in the priority queue of the sorted computing tasks for processing by the processing unit of the computer system. The processing device may iterate over the computing tasks in the priority queue to identify a computing task that can run on the processing unit. For example, the processing device can apply the attribute mask to one or more of the numerical representations of the sorted computing tasks. The application of the attribute mask to a given numerical representation of one of the sorted computing tasks may include compare the attribute with the first portion of the given numerical representation (e.g., the attribute bits). The comparison may be made by performing a bitwise operation (e.g. a single bitwise AND operation).

Refereeing to FIG. 7, method 700 begins at block 710 where a processing device may determine an ordered list of one or more attributes in view of priorities associated with the attributes. The ordered list may include, for example, a first attribute, a second attribute, a third attribute, etc. The first attribute, the second attribute, and the third attribute may be associated with a first priority, a second priority, and a third priority, respectively. The first priority may be higher than the second priority and the third priority. The second priority may be higher than the third priority.

At block 720, the processing device can generate a first numerical representation of the attributes in view of the ordered list of the attributes. For example, the processing device can assign a value to each of the attributes in the ordered list (e.g., an integer value or any other suitable value). The processing device can generate a binary representation of the sorted attributes (also referred to as the "attribute bits"). The bit position of a given attribute bit may correspond to its priority. For example, a first bit position of the first numerical representation of the attributes may correspond to a first attribute of a first priority. A second bit position of the first numerical representation of the attributes may correspond to a second attribute of a second priority. In some embodiments, the first bit position may be higher than the second bit position At block 730, the processing device can generate a second numerical representation of a priority of the computing task. The second numerical representation may include any suitable value indicative of the priority of the computing task. In some embodiments, the second numerical representation may be a binary representation of the priority that includes one or more bits indicative of the priority (also referred to as the "priority bits").

At block 740, the processing device can generate a third numerical representation for the computing task in view of the first numerical representation and the second numerical representation. The third numerical representation may be and/or include, for example, a combination of the first numerical representation and the second numerical representation. The first numerical representation may include the attribute bits and the priority bits. In some embodiments, the attribute bits and the priority bits may correspond to the lower-order bits and the higher-order bits of the third numerical representation, respectively.

Refereeing to FIG. 8, method 800 begins at block 810 where a processing device may acquire a priority queue of computing tasks to be processed. In one implementation, the priority queue may be acquired by performing one or more operations described in connection with blocks 610-630 of FIG. 6 above. In another example, the processing device can acquire the priority queue from a memory storing the priority queue or any other device that is capable of providing the priority queue.

At block 820, the processing device can search the priority queue for a computing task to be processed by a processing unit of the computer system. For example, the processing device can identify the computing task by performing one or more operations as described in connection with block 640 of FIG. 6.

At block 830, the processing device can determine whether a notification event is detected. The notification event may indicate that the computing tasks in the priority queue are not processed efficiently. Examples of the notification event may include an event indicating that the number of processing units of the computer system that can process a certain computing task or computing tasks of certain attributes is equal to or less than a first threshold, an event indicating that an average search depth for a predetermined number of processing units of the computer system is equal to or greater than a second threshold (e.g., the "queue search depth threshold"), an event indicating that the length of the priority queue (e.g., the number of the computing tasks in the priority queue) is greater than a third threshold, etc.

In some embodiments, the processing device can proceed to block 840 in response to detecting the notification event.

At block 840, the processing device can generate a notification indicative of the detection of the notification event. The notification may also include information about the computing tasks related to the notification event and/or one or more attributes related to the notification event. In some embodiments, the processing device can identify the computing tasks in the priority queue with positions under the queue search depth threshold (e.g., the first three computing tasks in some embodiments in which the query search depth threshold is three). The processing device can also identify one or more attributes related to the identified computing tasks as the attributes relating to the notification event (e.g., by performing a bitwise AND of the numerical representations of the identified computing tasks.)

In some embodiments, the processing device can proceed to block 850 in response to determining that a notification event has not been detected. At block 850, the processing device can determine whether a computing task of the priority queue has been identified for processing by the processing unit of the computer system.

In some embodiments, the processing device can loop back to block 820 in response to determining that a computing task of the priority queue is to be identified for processing by the processing unit of the computer system. Alternatively, the processing device can proceed to block 860 in response to determining that a computing task of the priority queue has been identified for processing by the processing unit of the computer system. At block 860, the processing device can distribute the identified computing task to the processing unit of the computer system for processing. For example, the processing device can send information and/or data related to the identified computing task to the processing unit of the computer system. The processing device may also remove the identified computing task from the priority queue.

Figure 9:
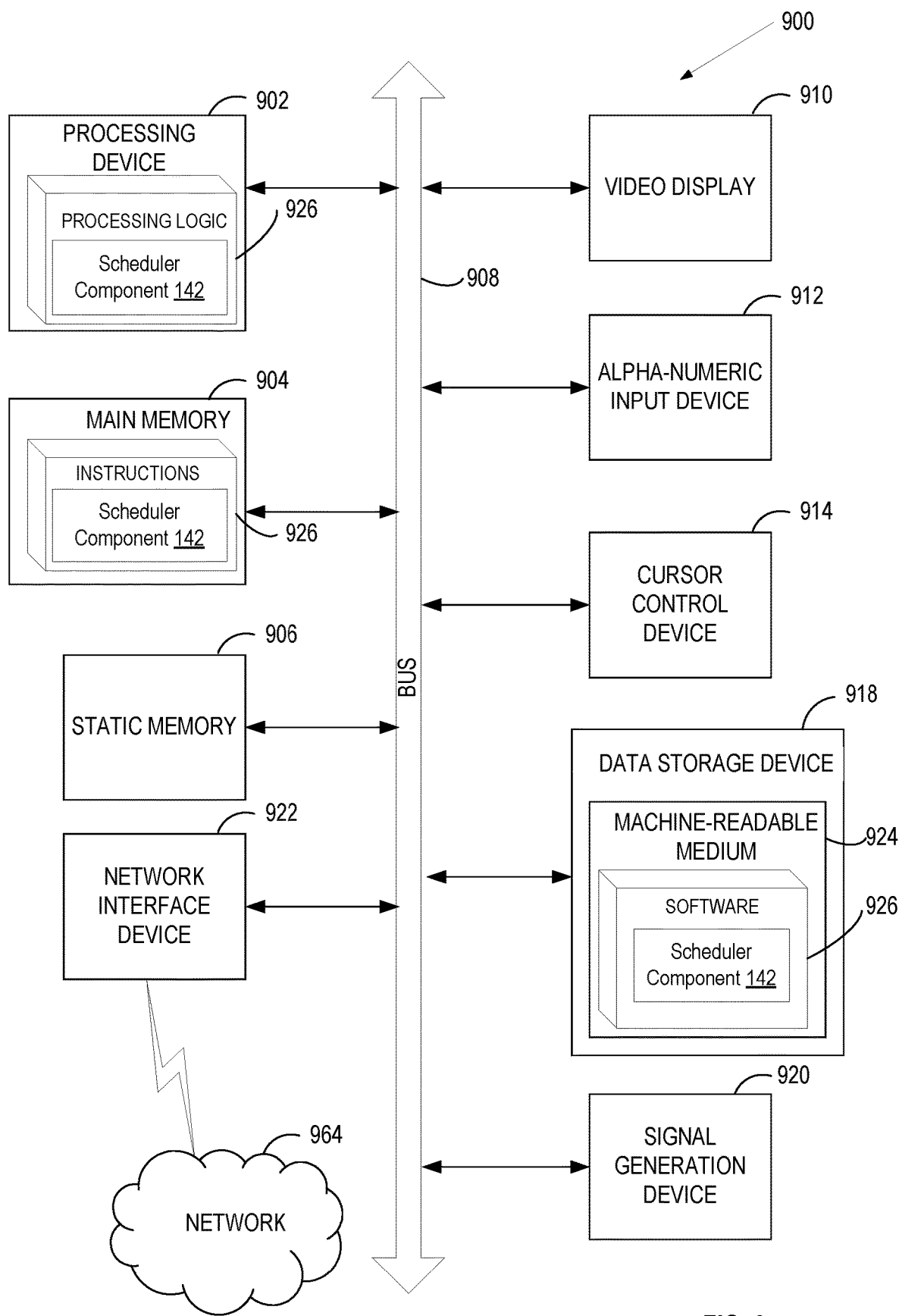
FIG. 9 illustrates a block diagram of one implementation of a computer system.

FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 900 includes a processing device 902 (e.g., processor, CPU, etc.), a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 408.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 900 may further include a network interface device 922 communicably coupled to a network 964. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a machine-accessible storage medium 924 on which is stored software 926 embodying any one or more of the methodologies of functions described herein. The software 926 may also reside, completely or at least partially, within the main memory 404 as instructions 926 and/or within the processing device 902 as processing logic 926 during execution thereof by the computer system 900; the main memory 904 and the processing device 902 also constituting machine-accessible storage media.

The machine-readable storage medium 924 may also be used to store instructions 926 to schedule computing tasks, such as the scheduler component 142 as described with respect to FIGS. 1 and 2, and/or a software library containing methods that call the above applications. While the machine-accessible storage medium 924 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Other computer system designs and configurations may also be suitable to implement the system and methods described herein. The following examples illustrate various implementations in accordance with one or more aspects of the present disclosure.

Example 1 is a method comprising: maintaining a priority queue comprising a plurality of computing tasks sorted in view of a plurality of numerical representations of priorities associated with the plurality of computing tasks, wherein a first portion of each of the plurality of numerical representations corresponds to a priority of a respective computing task of the plurality of computing tasks, and a second portion of each of the plurality of numerical representations corresponds to one or more attributes of the respective computing task of the plurality of computing tasks; determining, by a processing device, an attribute mask for a processing unit of a computer system, the attribute mask comprising a numerical representation of at least one attribute of the processing unit; and identifying, in view of the attribute mask, a computing task in the priority queue of the sorted computing tasks for processing by the processing unit of the computer system.

Example 2 includes the subject matter of example 1, wherein maintaining the priority queue comprises: sorting the plurality of computing tasks in view of the first portion of each of the plurality of numerical representations corresponding to the priority of the respective computing task of the plurality of computing tasks.

Example 3 includes the subject matter of example 2, wherein maintaining the priority queue further comprises: sorting the plurality of computing tasks in view of the first portion of each of the plurality of numerical representations.

Example 4 includes the subject matter of example 3, wherein maintaining the priority queue further comprises: sorting the plurality of computing tasks in view of the second portion of each of the plurality of numerical representations.

Example 5 includes the subject matter of example 1, wherein the second portion of each of the plurality of numerical representations comprises a first plurality of bits representing the one or more attributes of the respective computing task of the plurality of computing tasks, and wherein the attribute mask comprises a second plurality of bits representing the at least one attribute of the processing unit.

Example 6 includes the subject matter of example 5, wherein the first plurality of bits corresponds to an ordered list of the one or more attributes of the respective computing task of the plurality of computing tasks in view of priorities of the one or more attributes.

Example 7 includes the subject matter of example 1, wherein identifying, in view of the attribute mask, the first computing task in the priority queue of the sorted computing tasks comprises applying the attribute mask to at least one of the plurality of numerical representations of the priorities associated with the computing tasks.

Example 8 includes the subject matter of example 7, wherein identifying, in view of the attribute mask, the first computing task in the priority queue of the sorted computing tasks comprises performing a bitwise operation.

Example 9 includes the subject matter of example 1, wherein the attribute of the processing unit of the computer system comprises a compute resource of the processing unit.

Example 10 is a method, comprising: determining one or more attributes associated with a computing task; determining an ordered list of the attributes in view of priorities associated with the attributes; generating a first numerical representation of the attributes in view of the ordered list of the attributes; determining a second numerical representation of a priority of the computing task; and determining a third numerical representation of a total priority of the computing task in view of the first numerical representation and the second numerical representation.

Example 11 includes the subject matter of example 10, wherein generating the first numerical representation of the attributes comprises: assigning a first value to a first attribute associated with a first priority; assigning a second value to a second attribute associated with a second priority; and generating the first numerical representation of the attributes in view of the first value and the second value.

Example 12 includes the subject matter of example 11, wherein a first bit position of the first numerical representation corresponds to the first priority, and wherein a second bit position of the first numerical representation corresponds to the second priority.

Example 13 includes the subject matter of example 12, wherein the first bit position is higher than the second bit position, and wherein the first priority is higher than the second priority.

Example 14 includes the subject matter of example 10, further comprising generating an attribute mask for a processing unit of a computer system in view of the priorities of the attributes and at least one attribute of the processing unit.

Example 15 includes the subject matter of example 14, wherein the attribute mask comprises a numerical representation of the at least one attribute of the processing unit.

Example 16 includes the subject matter of example 10, wherein the third numerical representation corresponds to a combination of the first numerical representation and the second numerical representation.

Example 17 includes the includes the e subject matter of example 10, wherein the first numerical representation comprises a first plurality of bits, wherein the second numerical representation comprises a second plurality of bits.

Example 18 includes the subject matter of example 17, wherein the first plurality of bits corresponds to lower-order bits of the third numerical representation.

Example 19 is a method, comprising: searching a priority queue of computing tasks for a computing task to be processed by a first processing unit of a computer system; determining, by a processing device, whether a notification event is detected; and generating a notification in response to determining that the notification event is detected.

Example 20 includes the subject matter of example 19, further comprising determining one or more attributes of the computing tasks related to the notification event, wherein the notification comprises information of the attributes of the computing tasks related to the notification event.

Example 21 includes the subject matter of example 20, wherein determining that the notification event is detected comprises: determining that an average search depth for a predetermined number of processing units of the computer system is equal to or greater than a threshold.

Example 22 includes the subject matter of example 21, wherein the average search depth comprises an average of a plurality of search depths corresponding to the predetermined number of processing units of the computer system.

Example 23 includes the subject matter of example 21, further comprising: identifying one or more of the computing tasks in the priority queue in view of the threshold, wherein determining the one or more attributes of the computing tasks related to the notification event comprises performing a bitwise operation on a plurality of numerical representations of the identified computing tasks.

Example 24 includes the subject matter of example 19, further comprising: generating a plurality of numerical representations of the computing tasks; and sorting the computing tasks for the priority queue in view of the plurality of numerical representations of the computing tasks.

Example 25 includes the subject matter of example 24, wherein a first portion of each of the plurality of numerical representations corresponds to a priority of a respective computing task of the plurality of computing tasks, and wherein a second portion of each of the plurality of numerical representations corresponds to one or more attributes of the respective computing task of the plurality of computing tasks.

Example 26 includes the subject matter of example 25, further comprising determining an attribute mask for the first processing unit of a computer system, the attribute mask comprising a numerical representation of at least one attribute of the first processing unit.

Example 27 includes the subject matter of example 26, wherein searching the priority queue for the computing task to be processed by the first processing unit of the computer system comprises applying the attribute mask to at least one of the plurality of numerical representations of the computing tasks.

Example 28 includes the subject matter of example 27, wherein applying the attribute mask to at least one of the plurality of numerical representations of the computing tasks comprises comparing the attribute mask with at least one of the plurality of numerical representations of the computing tasks for a match.

Example 29 includes the subject matter of example 28, wherein applying the attribute mask to at least one of the plurality of numerical representations of the computing tasks comprises performing a bitwise operation.

Example 30 is an apparatus comprising: a processing device; and a means for maintaining a priority queue comprising a plurality of computing tasks sorted in view of a plurality of numerical representations of priorities associated with the computing tasks, wherein a first portion of each of the plurality of numerical representations corresponds to a priority of a respective computing task of the plurality of computing tasks, and a second portion of each of the plurality of numerical representations corresponds to one or more attributes of the respective computing task of the plurality of computing tasks; a means for determining an attribute mask for a processing unit of a computer system, the attribute mask comprising a numerical representation of at least one attribute of the processing unit; and a means for identifying, in view of the attribute mask, a computing task in the priority queue of the sorted computing tasks for processing by the processing unit of the computer system.

Example 31 includes the apparatus of example 30, further comprising the subject matter of any of examples 1-29.

Example 32 is a system comprising: a memory; and a processing device operatively coupled to the memory, the processing device to implement the subject matter of any of examples 1-29.

Example 33 is a system comprising: a memory; and a processing device operatively coupled to the memory, the processing device to implement the subject matter of any of examples 1-29.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "creating," "assigning," "providing," "executing," "removing," "copying," "storing," "running," "processing," "generating," "gathering," "storing," "allocating," "determining," "associating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
    determining a plurality of processing unit features for execution of a first computing task of a plurality of computing tasks within a priority queue;
    determining an ordered list of the plurality of processing unit features in view of feature priorities associated with the plurality of processing unit features;
    generating a first numerical representation of the plurality of processing unit features in view of the ordered list of the plurality of processing unit features;
    determining a second numerical representation of a processing priority of the first computing task relative to one or more second computing tasks of the plurality of computing tasks within the priority queue;
    determining a third numerical representation of a total priority of the first computing task in view of the first numerical representation and the second numerical representation;
    generating an attribute mask indicative of processing unit features provided by a processing unit of a computer system;
    based on a comparison between the attribute mask and the third numerical representation, selecting the first computing task from the plurality of computing tasks; and
    distributing the first computing task to the processing unit of the computer system.

2. The method of claim 1, wherein generating the first numerical representation of the plurality of processing unit features comprises:
    assigning a first value to a first processing unit feature of the plurality of processing unit features associated with a first priority;
    assigning a second value to a second processing unit feature of the plurality of processing unit features associated with a second priority; and
    generating the first numerical representation of the attributes in view of the first value and the second value.

3. The method of claim 2, wherein a first bit position of the first numerical representation corresponds to the first priority, and wherein a second bit position of the first numerical representation corresponds to the second priority.

4. The method of claim 3, wherein the first bit position is higher than the second bit position, and wherein the first priority is higher than the second priority.

5. The method of claim 1, wherein the attribute mask comprises a numerical representation of the processing unit features provided by the processing unit.

6. The method of claim 1, wherein the third numerical representation corresponds to a combination of the first numerical representation and the second numerical representation.

7. The method of claim 1, wherein the first numerical representation comprises a first plurality of bits, wherein the second numerical representation comprises a second plurality of bits.

8. The method of claim 7, wherein the first plurality of bits corresponds to lower-order bits of the third numerical representation.

9. A non-transitory machine-readable storage medium including instructions that, when accessed by a processing device, cause the processing device to:
    determining a plurality of processing unit features for execution of a first computing task of a plurality of computing tasks within a priority queue;
    determining an ordered list of the plurality of processing unit features in view of feature priorities associated with the plurality of processing unit features;
    generating a first numerical representation of the plurality of processing unit features in view of the ordered list of the plurality of processing unit features;
    determining a second numerical representation of a processing priority of the first computing task relative to one or more second computing tasks of the plurality of computing tasks within the priority queue;
    determining a third numerical representation of a total priority of the first computing task in view of the first numerical representation and the second numerical representation;
    generating an attribute mask indicative of processing unit features provided by a processing unit of a computer system;
    based on a comparison between the attribute mask and the third numerical representation, selecting the first computing task from the plurality of computing tasks; and
    distributing the first computing task to the processing unit of the computer system.

10. The non-transitory machine-readable storage medium of claim 9, wherein generating the first numerical representation of the plurality of processing unit features comprises:
    assigning a first value to a first processing unit feature of the plurality of processing unit features associated with a first priority;
    assigning a second value to a second processing unit feature of the plurality of processing unit features associated with a second priority; and
    generating the first numerical representation of the attributes in view of the first value and the second value.

11. The non-transitory machine-readable storage medium of claim 9, wherein a first bit position of the first numerical representation corresponds to the first priority, and wherein a second bit position of the first numerical representation corresponds to the second priority.

* * * * *